United States Patent
Saita

(10) Patent No.: US 11,893,292 B2
(45) Date of Patent: *Feb. 6, 2024

(54) INFORMATION PROCESSING APPARATUS, METHOD THEREFOR AND NON-TRANSITORY COMPUTER READABLE MEDIUM

(71) Applicant: FUJIFILM Business Innovation Corp., Tokyo (JP)

(72) Inventor: Takayoshi Saita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 508 days.

This patent is subject to a terminal disclaimer.

(21) Appl. No.: 16/556,179

(22) Filed: Aug. 29, 2019

(65) Prior Publication Data

US 2020/0285436 A1     Sep. 10, 2020

(30) Foreign Application Priority Data

Mar. 8, 2019 (JP) ................... 2019-042168

(51) Int. Cl.
   *G06F 3/12* (2006.01)
   *H04N 1/00* (2006.01)
   (Continued)

(52) U.S. Cl.
   CPC .......... *G06F 3/1238* (2013.01); *G06F 3/1222* (2013.01); *G06F 21/32* (2013.01);
   (Continued)

(58) Field of Classification Search
   CPC ...................................................... G06F 21/35
   See application file for complete search history.

(56) References Cited

U.S. PATENT DOCUMENTS

| | | | | |
|---|---|---|---|---|
| 6,041,410 | A | * 3/2000 | Hsu | G07C 9/28 |
| | | | | 713/186 |
| 7,711,961 | B2 | 5/2010 | Fujinuma et al. | |

(Continued)

FOREIGN PATENT DOCUMENTS

| | | |
|---|---|---|
| JP | 2005071225 | 3/2005 |
| JP | 2006079459 | 3/2006 |

(Continued)

OTHER PUBLICATIONS

"Notice of Reasons for Refusal of Japan Counterpart Application", dated Sep. 20, 2022, with English translation thereof, p. 1-p. 6.

*Primary Examiner* — Phy Anh T Vu

(74) *Attorney, Agent, or Firm* — JCIPRNET

(57) ABSTRACT

An information processing apparatus includes an authenticating unit, a transmitting unit, a detecting unit, and a determining unit. The authenticating unit authenticates a user who is holding a portable device. The transmitting unit transmits an action instructing signal for issuing an instruction to perform an action to a portable device that is associated with the user, via a radio communication line. The detecting unit detects a change of a status of the portable device that is being held by the user. The determining unit determines, by determining whether or not the change corresponds to the instructed action, whether or not the user is holding the portable device.

21 Claims, 15 Drawing Sheets

(51) Int. Cl.
    *G06F 21/32*    (2013.01)
    *G06F 21/35*    (2013.01)
    *H04W 12/63*    (2021.01)

(52) U.S. Cl.
    CPC ........... *G06F 21/35* (2013.01); *H04N 1/0049* (2013.01); *H04N 1/00342* (2013.01); *H04N 1/00488* (2013.01); *H04W 12/63* (2021.01)

(56) References Cited

U.S. PATENT DOCUMENTS

| | | | |
|---|---|---|---|
| 11,132,425 B1* | 9/2021 | Cohen | G06Q 20/4093 |
| 2005/0071647 A1* | 3/2005 | Fujinuma | H04W 12/33 |
| | | | 713/186 |
| 2006/0218627 A1 | 9/2006 | Komatsu | |
| 2011/0296513 A1* | 12/2011 | Kasad | H04L 63/105 |
| | | | 726/9 |
| 2015/0135284 A1* | 5/2015 | Bogard | H04L 63/107 |
| | | | 726/5 |
| 2015/0135310 A1* | 5/2015 | Lee | G06F 21/34 |
| | | | 726/20 |
| 2016/0154952 A1* | 6/2016 | Venkatraman | G06Q 20/40145 |
| | | | 726/19 |
| 2017/0011572 A1* | 1/2017 | Link | G06F 21/35 |
| 2017/0103647 A1* | 4/2017 | Davis | H04W 12/068 |
| 2020/0302077 A1* | 9/2020 | Cortez | H04L 9/3271 |
| 2020/0329031 A1* | 10/2020 | Hashimoto | G06F 21/32 |

FOREIGN PATENT DOCUMENTS

| | | |
|---|---|---|
| JP | 2006268689 | 10/2006 |
| JP | 2010066917 | 3/2010 |

* cited by examiner

FIG. 2

| USER ID | USER NAME | DEVICE ID |
|---------|-----------|-----------|
| 10012345 | TARO SUZUKI | 0078591 |
| 10012346 | JIRO YAMADA | 0043428 |
| 10012347 | TARO FUJI | 0010323 |
| 10012348 | HANAKO FUJI | 0076224 |
| ⋮ | ⋮ | ⋮ | ns
INFORMATION PROCESSING APPARATUS, METHOD THEREFOR AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-042168 filed Mar. 8, 2019.

BACKGROUND

(i) Technical Field

The present disclosure relates to an information processing apparatus and a non-transitory computer readable medium.

(ii) Related Art

In Japanese Unexamined Patent Application Publication No. 2005-071225, an electronic apparatus that detects bio-information indicating physical characteristics of a user to perform personal authentication and an authentication method are disclosed.

SUMMARY

Aspects of non-limiting embodiments of the present disclosure relate to providing an information processing apparatus that is capable of determining, in executing authentication of a user, whether or not the user is holding a portable device that is associated with the user and a non-transitory computer readable medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an authenticating unit, a transmitting unit, a detecting unit, and a determining unit. The authenticating unit authenticates a user who is holding a portable device. The transmitting unit transmits an action instructing signal for issuing an instruction to perform an action to a portable device that is associated with the user, via a radio communication line. The detecting unit detects a change of a status of the portable device that is being held by the user. The determining unit determines, by determining whether or not the change corresponds to the instructed action, whether or not the user is holding the portable device.

BRIEF DESCRIPTION OF THE DRAWINGS

Exemplary embodiments of the present disclosure will be described in detail based on the following figures, wherein:

FIG. 2 is a diagram illustrating an example of a user ID management table stored in a management server;

DETAILED DESCRIPTION

Exemplary embodiments of the present disclosure will be explained in detail with reference to drawings.

Figure 1:
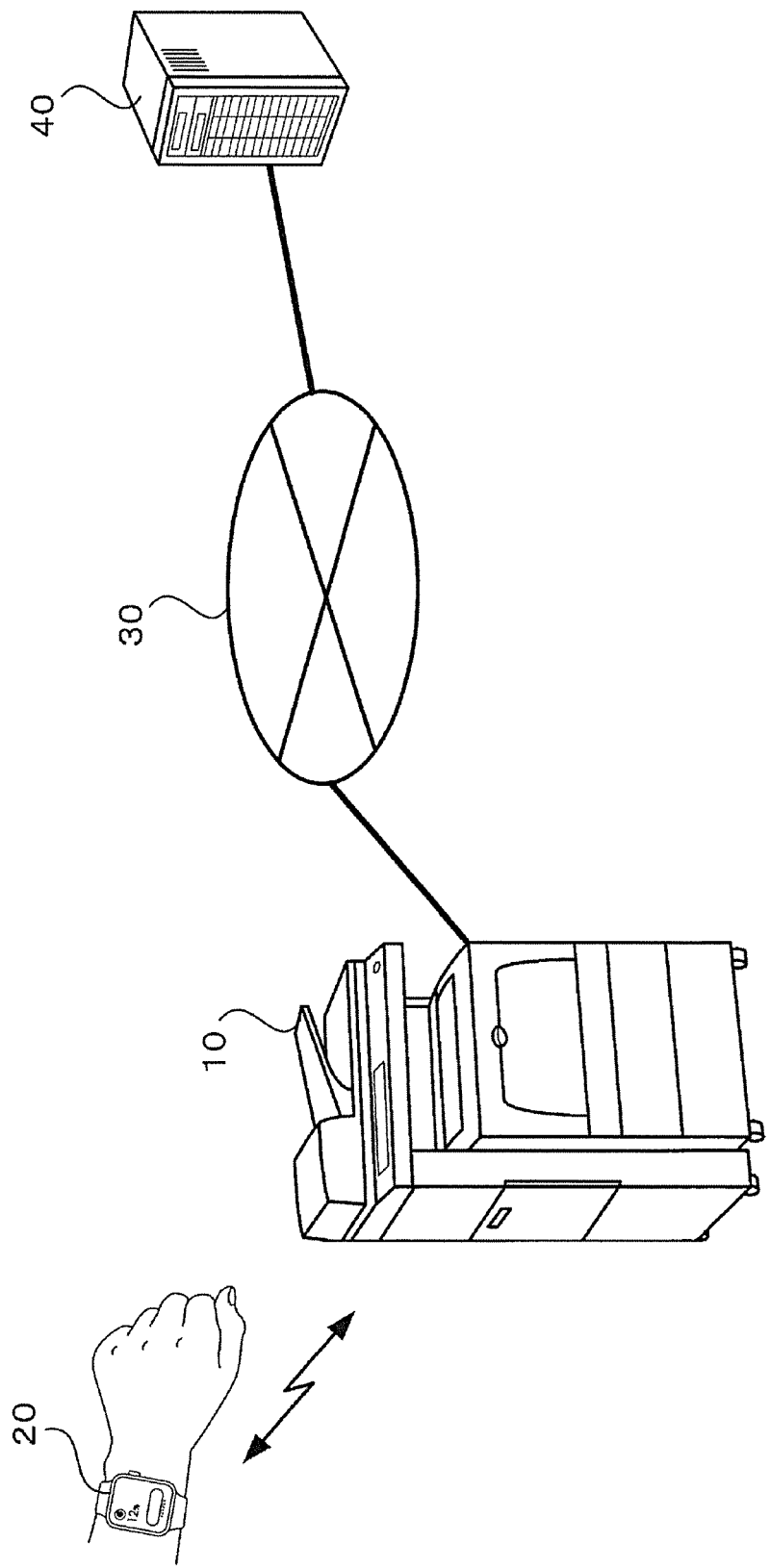
FIG. 1 is a diagram illustrating a system configuration of an information processing system according to an exemplary embodiment of the present disclosure.

FIG. 1 is a diagram illustrating a system configuration of an information processing system according to an exemplary embodiment of the present disclosure.

An information processing system according to an exemplary embodiment of the present disclosure includes, as illustrated in FIG. 1, an image forming apparatus 10, a wearable terminal device 20 that is being worn on an arm of a user, and a management server 40.

The image forming apparatus 10 and the management server 40 are connected via the Internet 30. Furthermore, the image forming apparatus 10 and the wearable terminal device 20 are connected via a short-range radio communication line such as a Bluetooth® low energy (BLE) line or the like.

The image forming apparatus 10 is an apparatus that is a so-called multifunction apparatus including a plurality of functions such as a print function, a scan function, a copy function, a facsimile function, and the like.

The wearable terminal device 20 includes various sensors and is used by being worn on an arm of a user. The wearable terminal device 20 includes a function for obtaining various types of sensor information including bio-information such as pulse rate, blood pressure, and the like, positional information, and the like of a user.

The image forming apparatus 10 functions as a gateway apparatus that acquires sensor information obtained by the wearable terminal device 20 and transfers the sensor information to the management server 40 via the Internet 30.

In FIG. 1, only one wearable terminal device 20 is illustrated. In actuality, however, a large number of wearable terminal devices 20 exist, and each of the wearable terminal devices 20 is associated with a user by whom it is supposed to be worn.

Different terminal IDs are allocated to the wearable terminal devices 20. The image forming apparatus 10 transfers sensor information acquired from the wearable terminal devices 20, along with the terminal IDs of the wearable terminal devices 20, to the management server 40.

The management server 40 manages each user based on a user ID of the user, and stores a user ID management table, as illustrated in FIG. 2. Thus, the management server 40 identifies a user ID that is associated with a terminal ID transferred along with sensor information from the image forming apparatus 10. The management server 40 stores, as user information of the identified user ID, sensor information transferred from the image forming apparatus 10.

An example of the user ID management table stored in the management server 40 is illustrated in FIG. 2. As is clear from the user ID management table illustrated in FIG. 2, a user ID, a user name, and a device ID are associated with one another. When a user ID is transmitted from the image forming apparatus 10 to the management server 40, the management server 40 transmits a device ID corresponding to the transmitted user ID to the image forming apparatus 10. The user ID management table may be held in advance in a gateway apparatus (in this example, the image forming apparatus 10).

The sensor information acquired as described above is then analyzed, so that the health status and actions of individual users may be evaluated. Accordingly, such sensor information is used as information for management of health statuses and reforming of operational processes.

By installing such image forming apparatuses 10 in various places in an office, sensor information of a large number of users may be obtained and collected in the management server 40.

However, if a user wrongly wears a wearable terminal device 20 that is associated with a different user, sensor information of the user is recorded as sensor information of the different user who is associated with the wearable terminal device 20 that is being worn by the user. Furthermore, a malicious user may wear a wearable terminal device 20 of a different user on purpose.

In such a situation, sensor information stored in the management server 40 is not correct, and therefore, management of health statuses and reforming of operational processes may not be properly performed.

Thus, in the information processing system according to this exemplary embodiment, it is determined whether or not a user is wearing a correct wearable terminal device 20 that is associated with the user as the device supposed to be held by the user.

Figure 3:
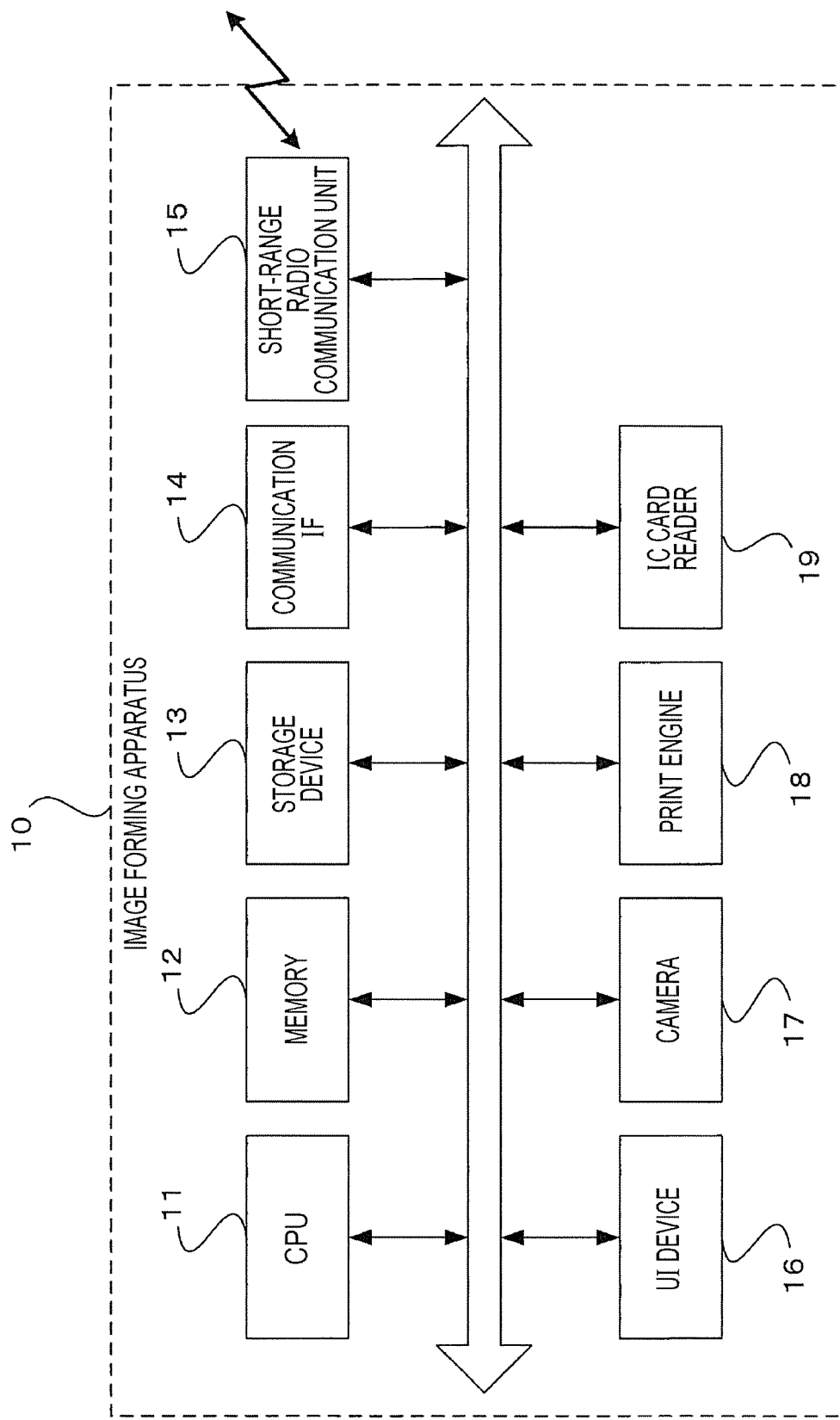
FIG. 3 is a block diagram illustrating a hardware configuration of an image forming apparatus according to an exemplary embodiment of the present disclosure.

FIG. 3 illustrates a hardware configuration of the image forming apparatus 10 in the information processing system according to this exemplary embodiment.

The image forming apparatus 10 includes, as illustrated in FIG. 3, a central processing unit (CPU) 11, a memory 12, a storage device 13 such as a hard disk drive, a communication interface (abbreviated as an IF) 14 for performing communication with an external apparatus via the Internet 30, a short-range radio communication unit 15 that performs short-range radio communication such as BLE, a user interface (abbreviated as UI) 16 that includes a touch panel or a liquid crystal display and a keyboard, a camera 17, a print engine 18, and an IC card reader 19.

The CPU 11 performs predetermined processing based on a control program stored in the memory 12 or the storage device 13, and controls an operation of the image forming apparatus 10. In this exemplary embodiment, the CPU 11 is explained as a unit that reads and executes the control program stored in the memory 12 or the storage device 13. However, the program may be stored in a recording medium such as a compact disc-read only memory (CD-ROM) and supplied to the CPU 11.

Figure 4:
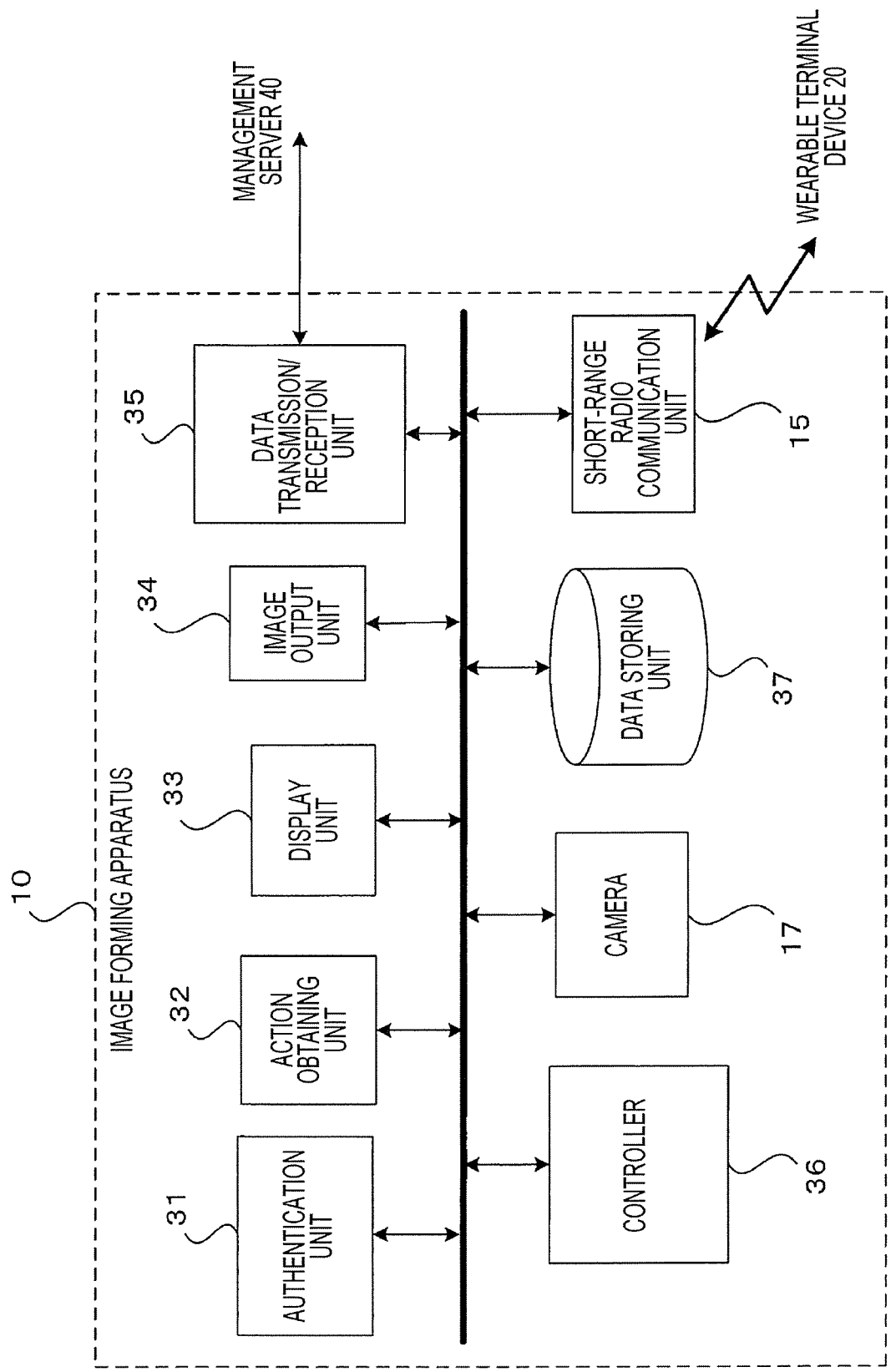
FIG. 4 is a block diagram illustrating a functional configuration of an image forming apparatus according to an exemplary embodiment of the present disclosure.

FIG. 4 is a block diagram illustrating a functional configuration of the image forming apparatus 10 that is implemented when the above-mentioned control program is executed.

The image forming apparatus 10 according to this exemplary embodiment includes, as illustrated in FIG. 4, an authenticating unit 31, an action obtaining unit 32, a display unit 33, an image output unit 34, a data transmission/reception unit 35, a controller 36, the camera 17, a data storing unit 37, and the short-range radio communication unit 15.

The authenticating unit 31 authenticates a user who is wearing the wearable terminal device 20. For example, when a user holds an IC card over the IC card reader, the authenticating unit 31 reads a user ID recorded in the IC card by short-range radio communication means (for example, radio frequency identification) different from the short-range radio communication unit 15 and identifies the user. Accordingly, the authenticating unit 31 performs authentication. The authenticating unit 31 may authenticate a user by confirming a user ID and a password input by the user.

The display unit 33 displays various types of information for a user, under the control of the controller 36. The action obtaining unit 32 obtains information of various actions performed by a user. The display unit 33 and the action obtaining unit 32 may be integrated together as a graphical interface.

The image output unit 34 outputs an image onto a recording medium such as printing paper, under the control of the controller 36.

The data transmission/reception unit 35 transmits and receives data to and from an external apparatus via a network such as the Internet 30. For example, the data transmission/reception unit 35 transmits various types of information including sensor information acquired from the wearable terminal device 20 to the management server 40 via the Internet 30.

The camera 17 shoots a static image or a moving image including at least part of the body of a user and the wearable terminal device 20 that is being worn by the user.

The data storing unit 37 temporarily stores sensor information acquired from the wearable terminal device 20 and stores various data such as print data generated by the controller 36.

The short-range radio communication unit 15 receives sensor information from the wearable terminal device 20 via the BLE communication line and transmits various action instructing signals such as light-emission instructing signals to the wearable terminal device 20. A radio communication line or the like such as Wi-Fi® as well as the BLE communication line may be used as the short-range radio communication line.

The short-range radio communication unit 15 is able to transmit a light-emission instructing signal only to the wearable terminal device 20 that is being worn on an arm of a user within a certain range, for example, 1 meter, from the image forming apparatus 10, by adjusting the intensity of output of radio electronic waves.

The controller 36 controls operations of other components of the image forming apparatus 10. For example, when a user who wishes to use the image forming apparatus 10 is authenticated by the authenticating unit 31, the controller 36 performs various operations such as copying, printing, and facsimile transmission and reception, in response to various operations from the authenticated user.

When the user is authenticated by the authenticating unit 31, the controller 36 identifies a terminal ID, which is identification information of the wearable terminal device 20 that is associated with the user authenticated by the authenticating unit 31. Specifically, the controller 36 transmits the user ID of the user authenticated by the authenticating unit 31 to the management server 40, and thus acquires a terminal ID associated with the user ID from the management server 40.

The controller 36 causes the short-range radio communication unit 15 to transmit an action instructing signal for issuing an instruction to perform a predetermined action to a portable device with the identified terminal ID, via the BLE communication line, which is a short-distance radio communication line.

Specifically, the controller 36 transmits a light-emission instructing signal indicating the identified terminal ID to the wearable terminal device 20, so that an action instruction for instructing a light-emission unit of the wearable terminal device 20 to emit light in a light-emission pattern randomly selected from among a plurality of predetermined light-emission patterns is transmitted to the wearable terminal device 20.

As described above, instead of a fixed light-emission pattern, a light-emission pattern that is difficult to be predicted by a user is used. Therefore, even if a user who is not wearing the correct wearable terminal device 20 tries to reproduce a light-emission pattern by different means on purpose so that a false determination result may be obtained, it is difficult to cause such a false determination.

The controller 36 detects a change of the status of the wearable terminal device 20 that is being worn by the user authenticated by the authenticating unit 31 from a moving image that is shot by the camera 17. Specifically, the controller 36 shoots, with the camera 17, a moving image including the wearable terminal device 20 that is being worn by the user authenticated by the authenticating unit 31, and thus detects the light-emission pattern of the wearable terminal device 20.

Alternatively, the controller 36 may cause the display unit 33 to display a message "Please press the button in synchronization with flashing of light." and allow the user to press a specific button in synchronization with the light-emission pattern of the wearable terminal device 20, so that a state in which the user is wearing the wearable terminal device 20 associated with the user may be confirmed.

In the case where the wearable terminal device 20 continuously obtains bio-information such as the pulse rate of a user, the controller 36 may determine that the correct wearable terminal device 20 continues to be worn, by confirming that bio-information is continuously detected without interruption from a point in time when the state in which the user is wearing the associated wearable terminal device 20 is confirmed.

Finally, the controller 36 compares the detected change of the status of the wearable terminal device 20 with contents of an action instructed by transmitting an action instructing signal and determines whether or not the wearable terminal device 20 associated with the user authenticated by the authenticating unit 31 is being worn.

Specifically, in the case where it is evaluated that a light-emission pattern obtained from a moving image that is shot by the camera 17 and a light-emission pattern instructed by transmitting a light-emission instructing signal match, the controller 36 determines that the user authenticated by the authenticating unit 31 is wearing the correct wearable terminal device 20 that is supposed to be worn by the user.

In contrast, in the case where it is not evaluated that the light-emission pattern obtained from the moving image that is shot by the camera 17 and the light-emission pattern instructed by transmitting the light-emission instructing signal match, the controller 36 determines that the user authenticated by the authenticating unit 31 is not wearing the correct wearable terminal device 20 that is supposed to be worn by the user, that is, the authenticated user is wrongly wearing the wearable terminal device 20 that is associated with another user.

In this exemplary embodiment, the wearable terminal device 20 is caused to emit light in a predetermined light-emission pattern in accordance with a light-emission instructing signal transmitted from the image forming apparatus 10 to the wearable terminal device 20. However, the image forming apparatus 10 may instruct the wearable terminal device 20 to perform an action involving a visual change, and the camera 17 may detect the visual change of the wearable terminal device 20 as a change of the status of the wearable terminal device 20.

For example, an action instructing signal may be transmitted to the wearable terminal device 20, so that the color or shape of the wearable terminal device 20 may be changed or specific letters, numbers, signs, or the like may be displayed on the display of the wearable terminal device 20.

In the case where an image of a specific letter, number, sign, emoticon, stamp, or the like or a combination thereof is displayed on the display of the wearable terminal device 20, the letter or the like may be detected by shooting the letter or the like by the camera 17. The size, color, display period, number of display times, number of displayed images, display interval, display pattern, or the like of a combination of images of a letter, number, sign, emoticon, stamp, and the like may be changed such that a user is not able to predict or copy easily when confirmation of wearing of the wearable terminal device 20 is performed. Alternatively, as means for confirming display contents on the display, instead of shooting by the camera 17 or by combining with shooting by the camera, a user who is wearing the wearable terminal device 20 may input displayed letter information using the action obtaining unit 32, so that letter information displayed on the wearable terminal device 20 may be detected based on the input letter information.

Furthermore, instead of causing the wearable terminal device 20 to generate a visual change, a status change in which sound is output from the wearable terminal device 20 may be generated so that the status change may be detected by a sound detection device of the image forming apparatus 10. Specifically, the image forming apparatus 10 may include a microphone for detecting sound. A sound output instructing signal may be transmitted from the controller 36 to the wearable terminal device 20 to instruct the wearable terminal device 20 to perform an action for outputting sound, and output sound may be detected by the microphone.

The controller 36 detects sound output from the wearable terminal device 20 to detect an auditory change of the wearable terminal device 20. Accordingly, the controller 36 determines whether or not the authenticated user is wearing the wearable terminal device 20 that is supposed to be worn by the user.

Furthermore, the image forming apparatus 10 may transmit an action instructing signal to the wearable terminal device 20 to cause a tactile change of the wearable terminal device 20, for example, generate vibrations, so that the tactile change may be detected. Furthermore, the user may be instructed to operate a specific button of the image forming apparatus 10 in accordance with start or stop of vibrations of the wearable terminal device 20. When the user operates the specific button, start or stop of vibrations of the wearable terminal device 20 may be detected.

Furthermore, the image forming apparatus 10 may include a receiver that receives a radio signal transmitted from the wearable terminal device 20. When the image forming apparatus 10 transmits to the wearable terminal device 20 an action instructing signal for instructing an action for transmitting a radio signal of a specific frequency and receives the radio signal of the specific frequency transmitted from the wearable terminal device 20, a change of the status of the wearable terminal device 20 may be detected.

In the case where it is determined that the user authenticated by the authenticating unit 31 is not wearing the wearable terminal device 20 that is associated with the authenticated user, the controller 36 notifies a predetermined notification destination that the authenticated user is not wearing the associated wearable terminal device 20.

Specifically, the controller 36 may provide notification by displaying information indicating that the correct wearable terminal device 20 is not being worn on the display unit 33 of the image forming apparatus 10. Alternatively, the controller 36 may notify a predetermined notification destination of information indicating that there is a user who is not properly wearing the wearable terminal device 20 that is set to be worn and a user ID of the user in association with each other, using predetermined information such as an e-mail address or the like. The notification destination may be, for example, an e-mail address of the user who is wearing the current wearable terminal device 20 and is authenticated by the authenticating unit 31. Furthermore, the notification destination may be an e-mail address of a user who is associated with the wearable terminal device 20 in the user ID management table, an e-mail address of an administrator who manages the system, or the like.

Furthermore, a notification indicating that it is determined that the authenticated user is not wearing the wearable terminal device 20 that is associated with the authenticated user may be transmitted to the management server 40 as a notification destination. A notification indicating that an authenticated user is wearing the wearable terminal device 20 that is associated with the authenticated user may be transmitted to a notification destination.

Furthermore, information indicating that a device is being worn and/or is not being worn may be notified, along with time information of the time at which the wearing state is determined and information of identifying the gateway apparatus (in this example, the image forming apparatus 10) that has performed user authentication, to the notification destination. By notifying that the information indicating that a device is being worn/is not being worn, the determination time information, and the information of identifying the gateway apparatus that has performed user authentication at the same time and storing the above information in the management server 40 or the like, the gateway apparatus that has confirmed whether or not the wearable terminal device 20 is being worn may be identified chronologically. In the case where the wearable terminal device 20 includes a position measurement sensor (global positioning system (GPS)), detected positional information may be notified to the management server 40 or the like.

In the case where the authenticated user is not wearing the wearable terminal device 20 that is associated with the authenticated user, the controller 36 may dispose of the sensor information acquired from the wearable terminal device 20 as invalid sensor information so that the sensor information is not transferred to the management server 40 or may be transferred to the management server 40 along with information indicating that the sensor information is not correct sensor information.

Furthermore, in the case where the authenticated user is wearing the wearable terminal device 20 that is associated with the authenticated user, the controller 36 performs processing by regarding the sensor information transmitted from the wearable terminal device 20 as valid sensor information. Specifically, in the case where the authenticated user is wearing the wearable terminal device 20 that is associated with the authenticated user, the controller 36 transfers the sensor information transmitted from the wearable terminal device 20, along with information indicating that the sensor information is valid, to the management server 40.

In analyzing activities, health statuses, and the like of individual users, based on the sensor information transferred from the image forming apparatus 10, the management server 40 performs various types of analysis without using sensor information transferred along with information indicating that the sensor information is not correct sensor information. Therefore, more accurate analysis for each user may be achieved.

Furthermore, in analyzing activities, health statuses, and the like of individual users, based on the sensor information transferred from the image forming apparatus 10, the management server 40 may perform various types of analysis using only valid sensor information that is transferred along with information indicating that wearing of the correct wearable terminal device 20 associated with the user is confirmed.

Next, a functional configuration of the wearable terminal device 20 according to this exemplary embodiment will be explained with reference to a block diagram of FIG. 5.

Figure 5:
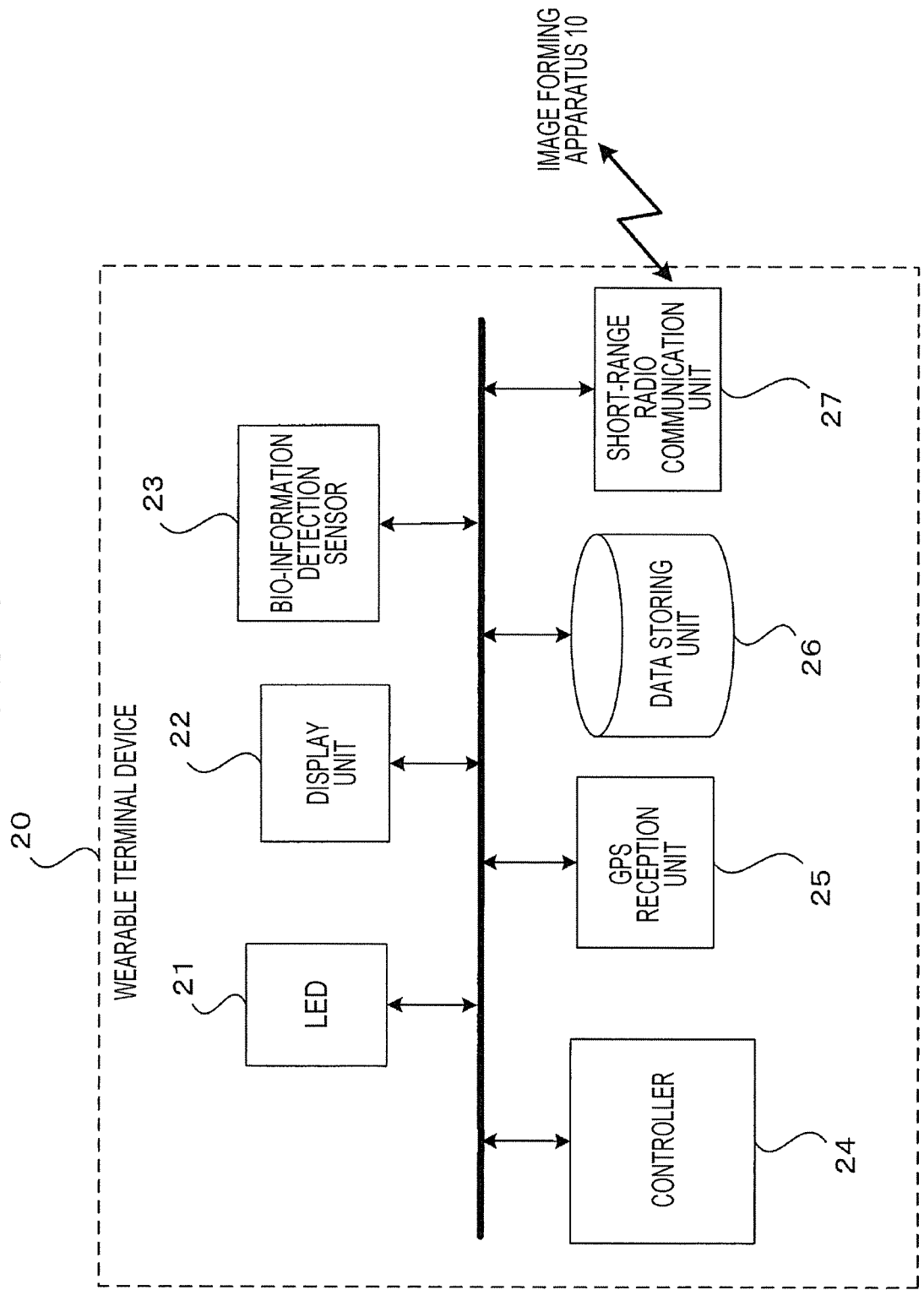
FIG. 5 is a block diagram illustrating a functional configuration of a wearable terminal device 20 according to an exemplary embodiment of the present disclosure.

The wearable terminal device 20 includes, as illustrated in FIG. 5, a light-emitting diode (LED) 21, a display unit 22, a bio-information detection sensor 23, a controller 24, a GPS reception unit 25, a data storing unit 26, and a short-range radio communication unit 27.

The LED 21 is light-emitting means for performing a light-emission action by entering a turned-on or turned-off state, under the control of the controller 24. The light-emitting means may be an element that emits light, like the LED 21 according to this exemplary embodiment or an electroluminescence (EL) element, or a liquid crystal element and a backlight that are combined to provide light emission by causing backlight light to transmit by a shutter action of liquid crystal.

The bio-information detection sensor 23 detects various types of bio-information such as the pulse rate, blood pressure, body temperature, and the like of a user who is wearing the wearable terminal device 20. The GPS reception unit 25 detects positional information of the user.

The data storing unit 26 stores various types of bio-information detected by the bio-information detection sensor 23 and positional information detected by the GPS reception unit 25, along with time information.

The short-range radio communication unit 27 transmits and receives data to and from the image forming apparatus 10 via the BLE communication line. The display unit 22 displays various types of letter information for the user, under the control of the controller 24.

The controller 24 transmits various types of sensor information such as bio-information and positional information stored in the data storing unit 26 to the image forming apparatus 10 via the short-range radio communication unit 27.

Furthermore, the controller 24 performs an action based on an action instructing signal received from the image forming apparatus 10 via the short-range radio communication unit 27. Specifically, the controller 24 performs a light-emission action by turning on or turning off the LED 21, based on a light-emission instructing signal received from the image forming apparatus 10 via the short-range radio communication unit 27.

The light-emission instructing signal includes a terminal ID for identifying the wearable terminal device 20 to which light-emission is instructed. The controller 24 performs a light-emission action based on the received light-emission instructing signal only in a case where the terminal ID included in the light-emission instructing signal and the terminal ID of the device including the controller 24 match.

Figure 6:
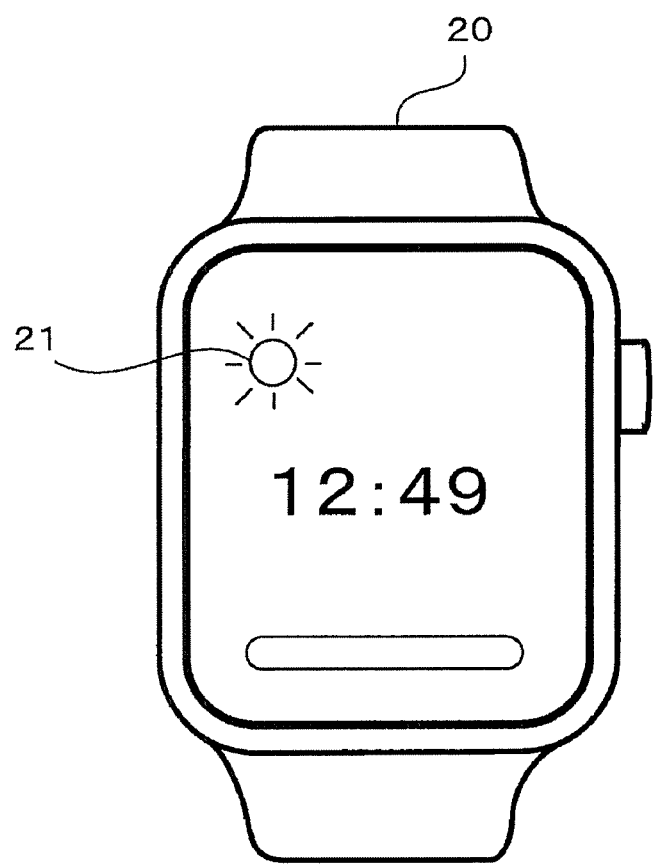
FIG. 6 is a diagram illustrating an external appearance of a wearable terminal device according to an exemplary embodiment of the present disclosure.

FIG. 6 illustrates an external appearance of the wearable terminal device 20 having the configuration described above. The wearable terminal device 20 illustrated in FIG. 6 includes the LED 21 on a part of the display.

Next, an operation of the information processing system according to this exemplary embodiment will be explained in detail with reference to drawings.

Figure 7:
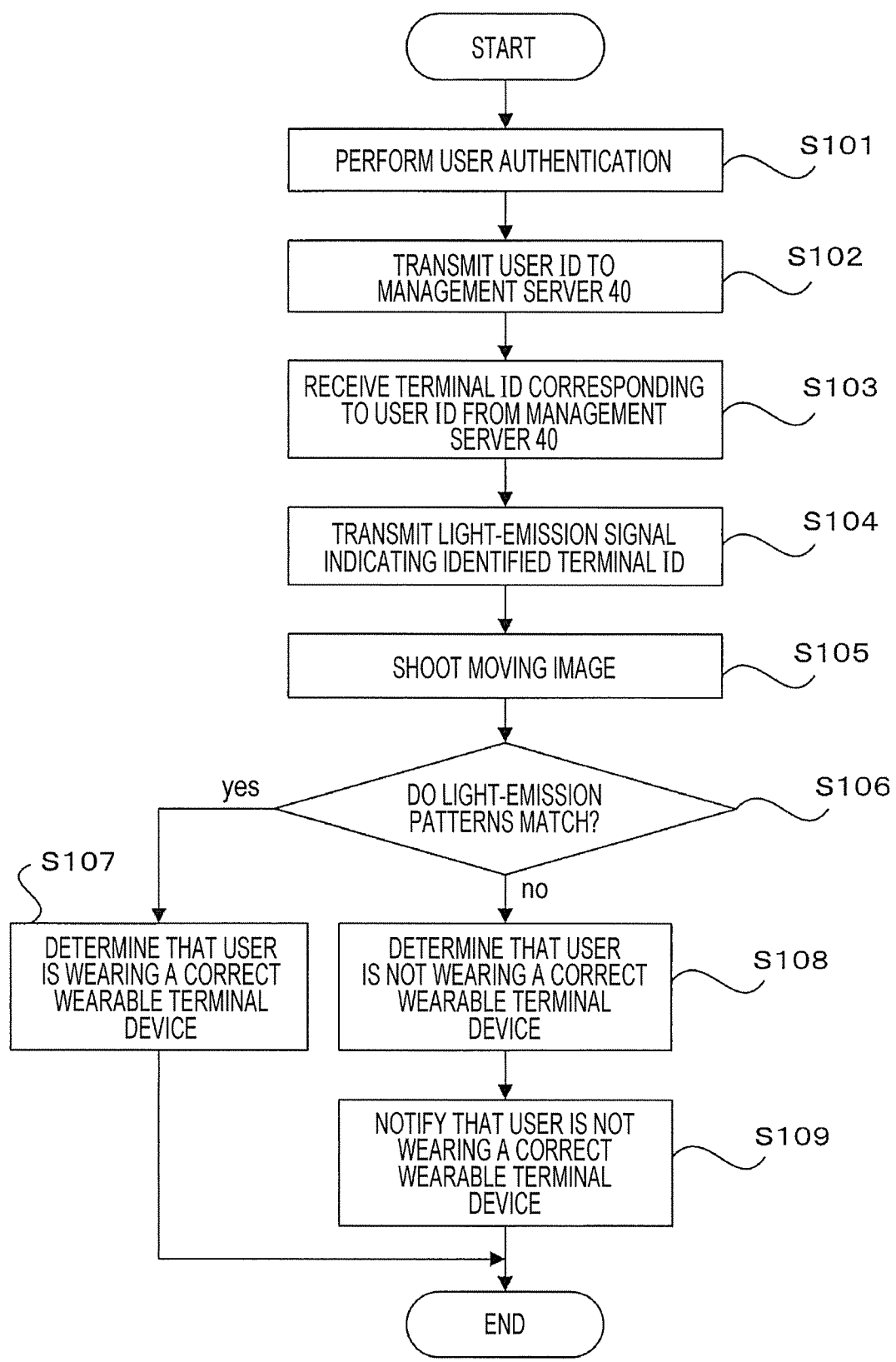
FIG. 7 is a flowchart for explaining an operation of an image forming apparatus according to an exemplary embodiment of the present disclosure.

First, an operation of the image forming apparatus 10 according to this exemplary embodiment will be explained with reference to a flowchart of FIG. 7.

In step S101, the image forming apparatus 10 performs authentication of a user who wishes to use the image forming apparatus 10 when the user brings an IC card in which a user ID of the user is stored close to the IC card reader of the image forming apparatus 10.

In step S102, the image forming apparatus 10 transmits the user ID of the authenticated user to the management server 40 via the Internet 30.

Then, in step S103, the image forming apparatus 10 receives a terminal ID corresponding to the user ID from the management server 40.

In step S104, the image forming apparatus 10 randomly selects a light-emission pattern from among a plurality of predetermined light-emission patterns, and transmits a light-emission signal indicating the identified terminal ID corresponding to the user ID to the wearable terminal device 20 via the BLE communication line.

Figure 8:
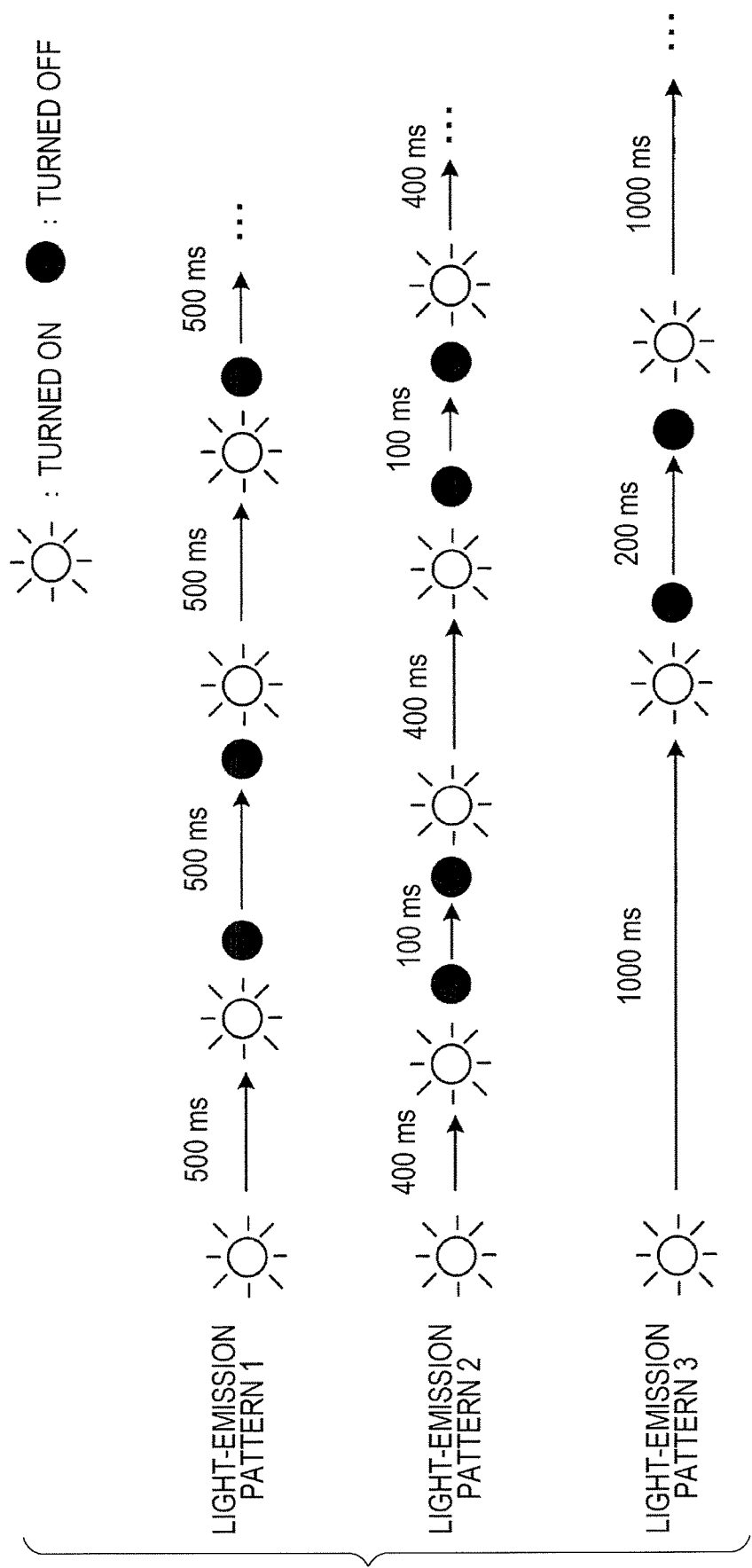
FIG. 8 is a diagram for explaining various light-emission patterns.

FIG. 8 illustrates examples of light-emission patterns. As illustrated in FIG. 8, for example, a light-emission pattern in which turning-on for 500 milliseconds and turning-off for 500 milliseconds are repeated is set as light-emission pattern 1, and a light-emission pattern in which turning-on for 400 milliseconds and turning-off for 100 milliseconds are repeated is set as light-emission pattern 2. In a similar manner, as illustrated FIG. 8, a light-emission pattern in which turning-on for 1,000 milliseconds and turning-off for 200 milliseconds are repeated is set as light-emission pattern 3.

In the image forming apparatus 10, an arbitrary light-emission pattern is randomly selected from among the plurality of light-emission patterns mentioned above. Therefore, it is difficult for a user to predict the present light-emission pattern.

Figure 9:
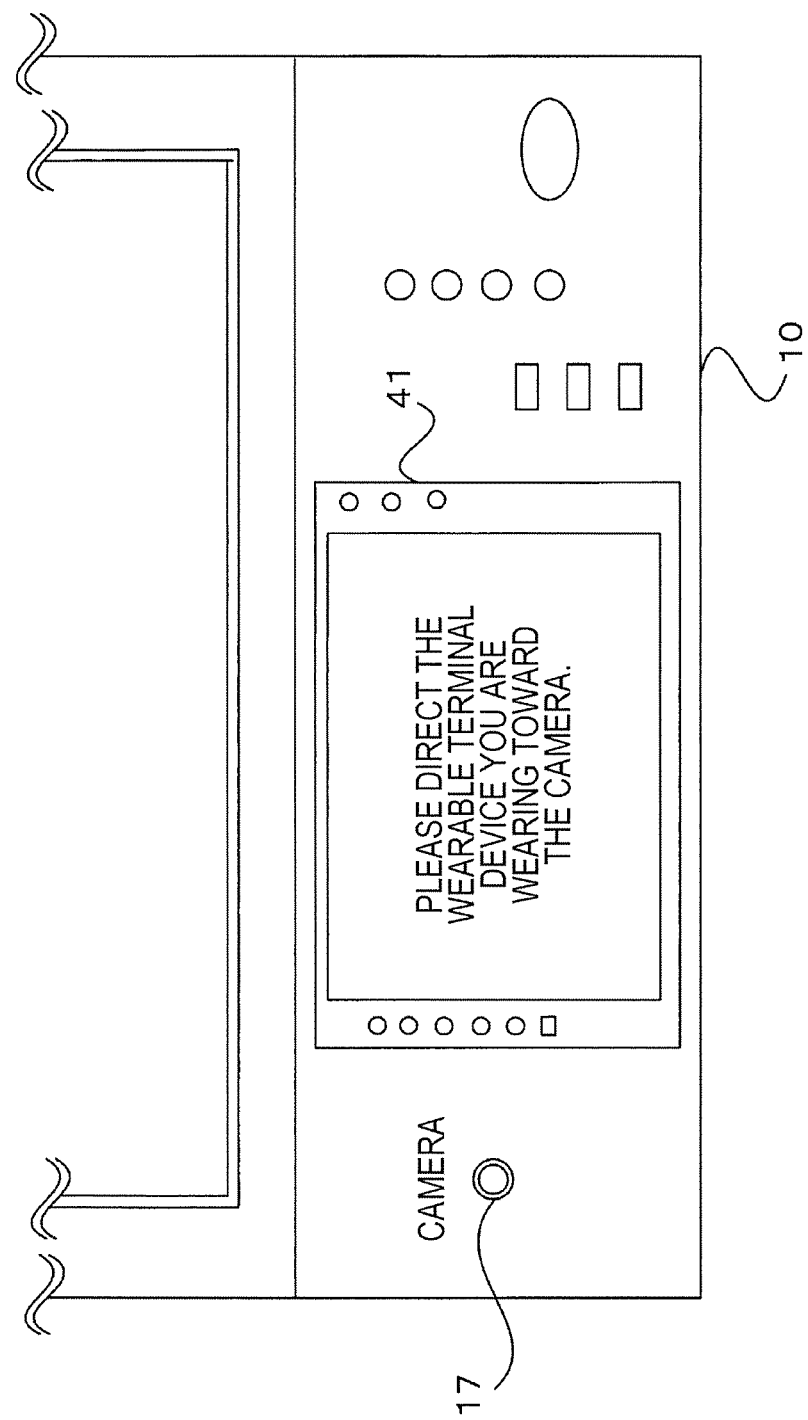
FIG. 9 is a diagram illustrating an example of display for instructing a user to direct a wearable terminal device that the user is wearing toward a camera.

In step S105, the image forming apparatus 10 causes display, for example, illustrated in FIG. 9, to be displayed on an operation panel 41, so that the wearable terminal device 20 that is being worn by the user is shot by the camera 17. In this example, the light-emission pattern of the LED 21 of the wearable terminal device 20 is shot. Therefore, a moving image of the wearable terminal device 20 is shot by the camera 17.

Figure 10:
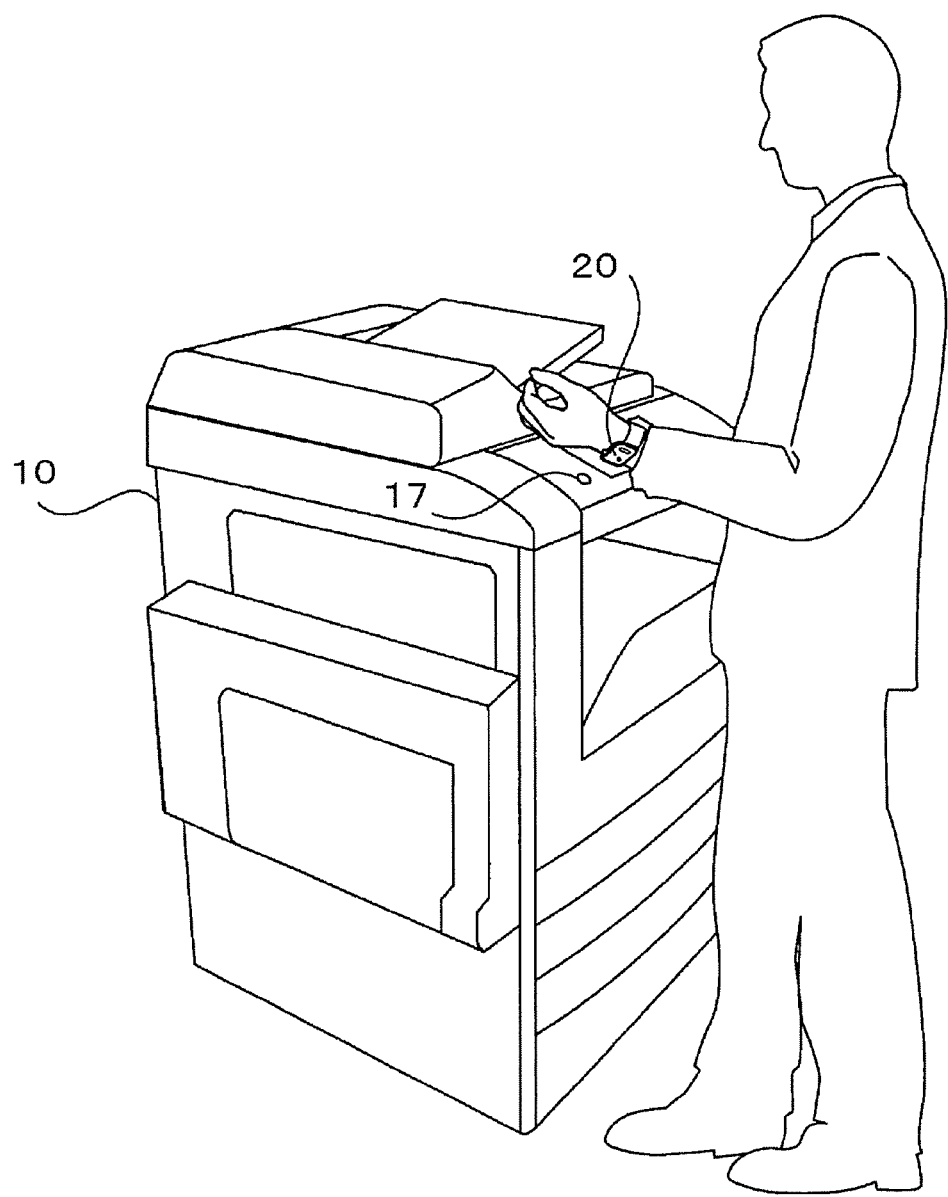
FIG. 10 is a diagram illustrating a state in which the user directs the wearable terminal device that is being worn on an arm of the user toward the camera in accordance with the instruction displayed on an operation panel.

FIG. 10 illustrates a state in which a user directs the wearable terminal device 20 that is being worn on an arm of the user toward the camera 17, in accordance with an instruction displayed by the operation panel 41.

In step S106, the image forming apparatus 10 determines whether or not the light-emission pattern detected from the moving image that is shot by the camera 17 and the light-emission pattern instructed by the light-emission instructing signal match.

In the case where the user is correctly wearing the wearable terminal device 20 with the terminal ID associated with the user ID of the user, the LED 21 of the wearable terminal device 20 that is being worn on an arm of the user emits light in the instructed light-emission pattern, based on a light-emission instructing signal transmitted from the image forming apparatus 10.

Thus, in the case where it is determined in step S106 that the light-emission patterns match, the image forming apparatus 10 determines in step S107 that the user is wearing the correct wearable terminal device 20.

In the case where it is determined in step S106 that the light-emission patterns do not match, the image forming apparatus 10 determines in step S108 that the user is not wearing the correct wearable terminal device 20.

In step S109, the image forming apparatus 10 notifies that the user is not wearing the correct wearable terminal device 20, for example, by displaying, on the operation panel 41, information indicating that the user is not wearing the correct wearable terminal device 20.

Figure 11:
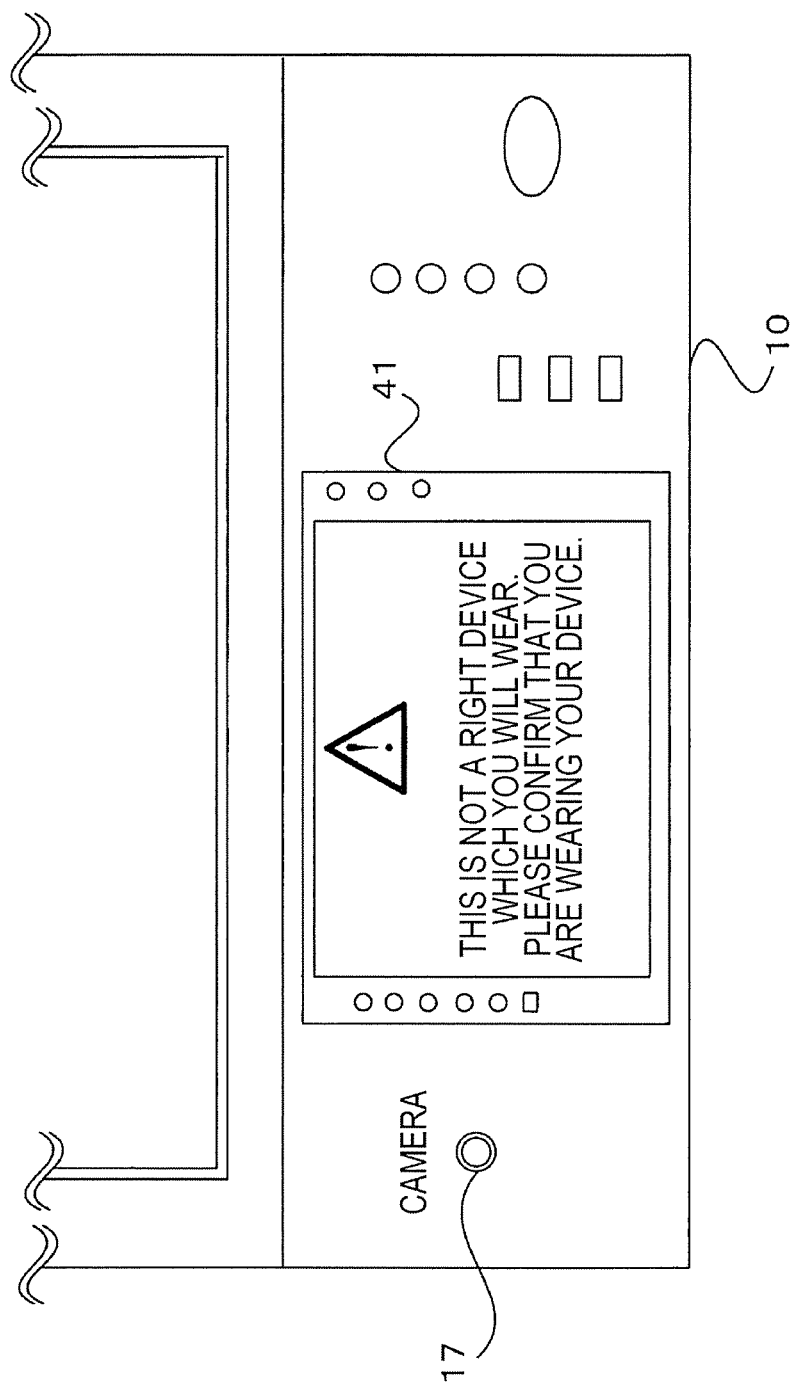
FIG. 11 is a diagram illustrating an example of a case where information indicating that a user is not wearing a correct wearable terminal device is displayed on the operation panel of the image forming apparatus.

FIG. 11 illustrates an example of a case where information indicating that the user is not wearing the correct wearable terminal device 20 is displayed on the operation panel 41 as described above. As illustrated in FIG. 11, letters "Are you sure that the wearable terminal device you are wearing is not someone else's device? Please confirm that you are wearing your device." are displayed on the operation panel 41, and contents for prompting the user to confirm that the wearable terminal device 20 being worn by the user is the correct wearable terminal device 20 that is supposed to be worn by the user are thus displayed.

Figure 12:
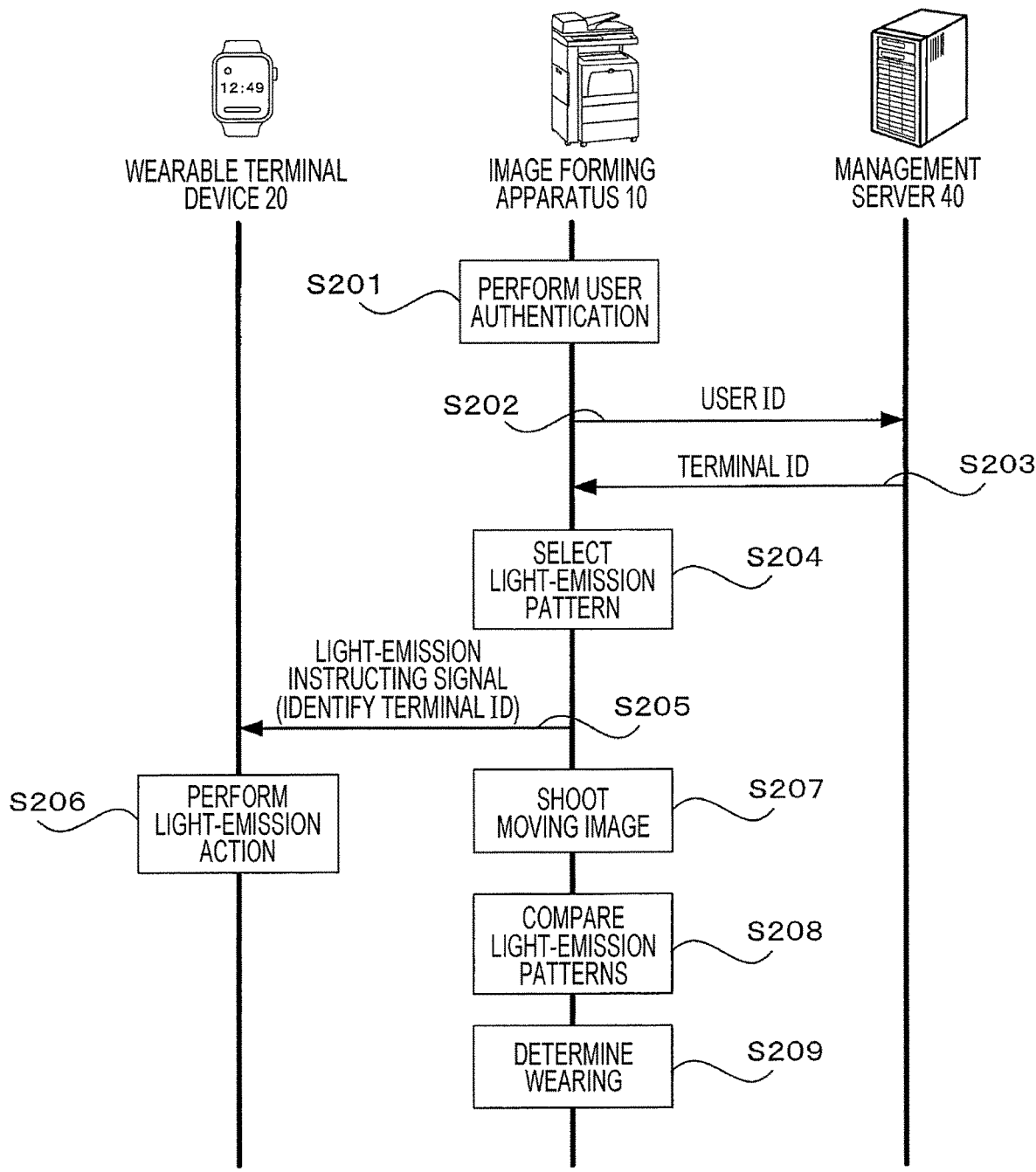
FIG. 12 is a sequence chart for explaining an operation for performing a determination, based on a light-emission pattern, as to wearing of a wearable terminal device.

Finally, a state in which data transmission and reception among the wearable terminal device 20, the image forming apparatus 10, and the management server 40 described above is illustrated in a sequence chart of FIG. 12.

First, in step S201, the image forming apparatus 10 performs user authentication. In step S202, the image forming apparatus 10 transmits a user ID of the authenticated user to the management server 40.

Then, in step S203, the management server 40 transmits a terminal ID corresponding to the transmitted user ID to the image forming apparatus 10.

In step S204, the image forming apparatus 10 selects a light-emission pattern. In step S205, the image forming apparatus 10 transmits a light-emission instructing signal for issuing an instruction to implement the selected light-emission pattern to the wearable terminal device 20 whose terminal ID is identified by the management server 40.

In step S206, the wearable terminal device 20 that has received the light-emission instructing signal from the image forming apparatus 10 performs a light-emission action in the light-emission pattern based on the received light-emission instructing signal.

In step S207, the image forming apparatus 10 shoots, with the camera 17, a moving image of a light-emission action of the wearable terminal device 20.

Next, in step S208, the image forming apparatus 10 determines whether or not the light-emission pattern of the transmitted light-emission instructing signal and the light-emission pattern of the wearable terminal device 20 in the shot moving image match.

In step S209, the image forming apparatus 10 performs a wearing determination for determining, based on a result of the determination as to whether or not the light-emission patterns match, whether or not the wearable terminal device 20 that is being worn by the user is the device associated with the user.

In the foregoing exemplary embodiment, by confirming, with the camera 17, whether or not the wearable terminal device 20 emits light in a specific light-emission pattern, it is determined whether or not an authenticated user is wearing the correct wearable terminal device 20.

However, by causing the wearable terminal device 20 to display a specific authentication number and prompting the user to input the displayed authentication number, it may be determined whether or not the authenticated user is wearing the correct wearable terminal device 20, without using a camera.

Figure 13:
FIG. 13 is a diagram illustrating an example of a case where an authentication number is displayed on a display of the wearable terminal device.

For example, in the case where an authentication number is displayed on the display of the wearable terminal device 20, as illustrated in FIG. 13, and input of the displayed authentication number to the image forming apparatus 10 by the user is confirmed, it is confirmed that the user is wearing the correct wearable terminal device 20.

Figure 14:
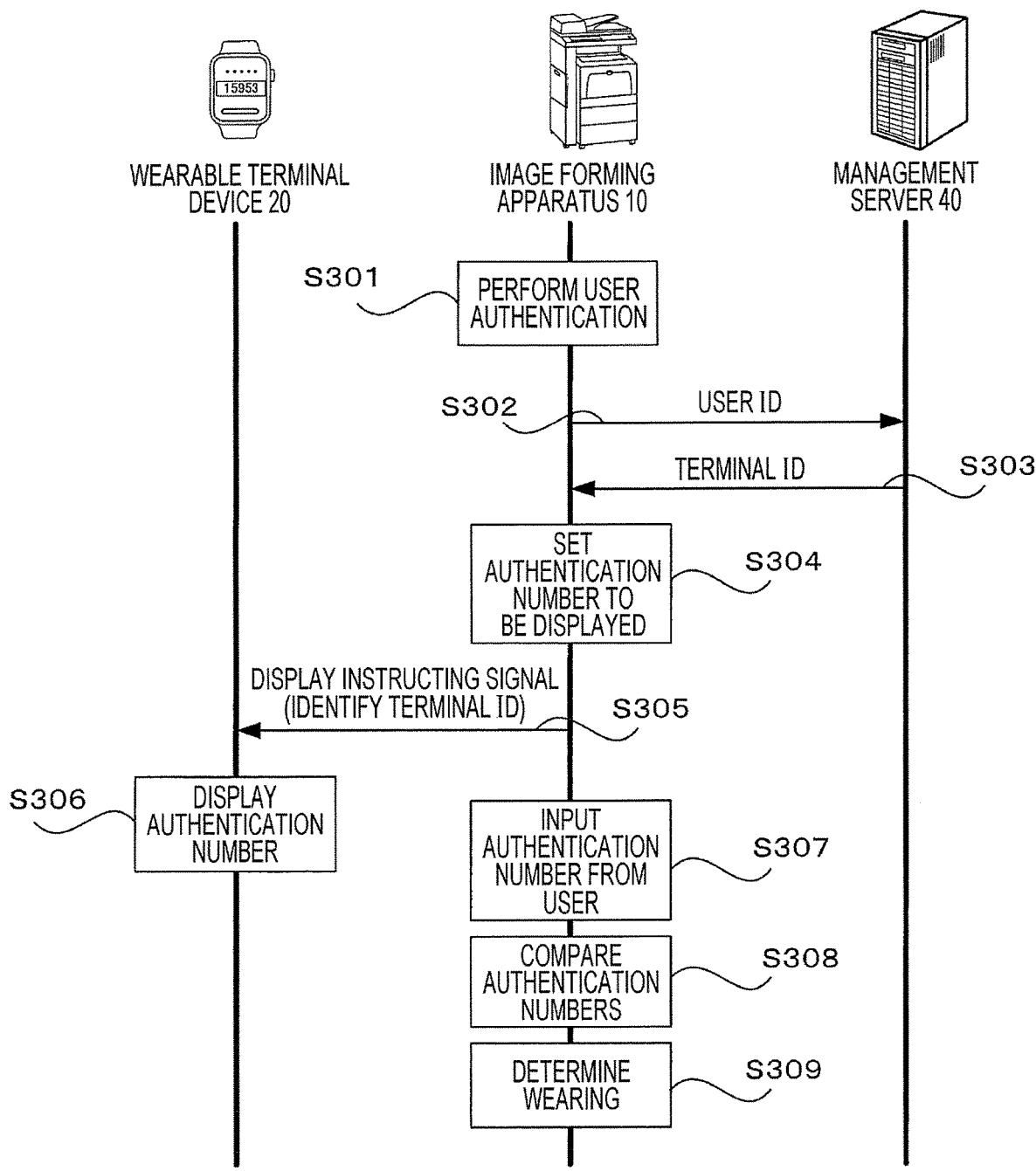
FIG. 14 is a sequence chart for explaining an operation for performing a determination, based on an authentication number, as to wearing of a wearable terminal device.

An operation in a case where a wearing determination for the wearable terminal device 20 is performed based on such an authentication number will be explained below with reference to a sequence chart of FIG. 14.

First, in step S301, the image forming apparatus 10 performs user authentication. In step S302, the image forming apparatus 10 transmits a user ID of the authenticated user to the management server 40.

In step S303, the management server 40 transmits a terminal ID corresponding to the transmitted user ID to the image forming apparatus 10.

In step S304, the image forming apparatus 10 sets an authentication number to be displayed. In step S305, the image forming apparatus 10 transmits a display instructing signal for issuing an instruction to display the set authentication number to the wearable terminal device 20 whose terminal ID is identified by the management server 40.

In step S306, the wearable terminal device 20 that has received the display instructing signal from the image forming apparatus 10 displays the authentication number based on the received display instructing signal on the display.

In step S307, the user inputs an authentication signal to the image forming apparatus 10.

Next, in step S308, the image forming apparatus 10 determines whether or not the authentication number displayed based on the display instructing signal and the authentication number input by the user match.

Then, in step S309, the image forming apparatus 10 performs a wearing determination for determining, based on a result of the determination as to whether or not the authentication numbers match, whether or not the wearable terminal device 20 that is being worn by the user is the device that is associated with the user.

Furthermore, by displaying code information that is not able to be deciphered by human sight such as QR Code®, instead of the authentication number, on the display of the wearable terminal device 20, and shooting the code information by the camera 17 of the image forming apparatus 10, it may be determined whether or not the displayed code information and the shot code information match to perform a wearing determination for the wearable terminal device 20.

Figure 15:
FIG. 15 is a diagram illustrating an example of a case where code information is displayed on the display of the wearable terminal device.

FIG. 15 illustrates an example of a case in which such code information is displayed on the display of the wearable terminal device 20.

Modifications

In the foregoing exemplary embodiment, the case where the determination as to whether or not a user is wearing the correct wearable terminal device 20 that is supposed to be worn by the user is performed is explained. However, the present disclosure is not limited to the configuration described above. The present disclosure may be applied in a similar manner to any portable device that includes a radio communication function and a function for emitting light in accordance with a light-emission instructing signal from the image forming apparatus 10 and is able to be held by the user.

The present disclosure is also applicable in a similar manner to a case where, for example, the portable device is embedded in a nameplate or uniform and it is thus determined whether or not the user is holding the portable device that is supposed to be held by the user or an object in which the portable device is embedded, such as whether or not the user is wearing the nameplate that is supposed to be worn by the user or whether or not the user is wearing the supplied his/her uniform.

Furthermore, in the foregoing exemplary embodiment, the case where the image forming apparatus 10 transfers sensor information acquired from the wearable terminal device 20 to the management server 40 is explained. However, the present disclosure is not limit to this configuration. The present disclosure may be applied in a similar manner to an information processing apparatus different from the image forming apparatus 10 as long as the information processing apparatus performs authentication of a user who wishes to use the information processing apparatus.

The present disclosure is also applicable in a similar manner to a case where an apparatus that performs authentication of a user who wishes to use the apparatus, such as an automatic teller machine (ATM) apparatus that performs authentication of a user who wishes to deposit or withdraw cash, a ticket gate of public transport such as a train, a bus, or the like, an automobile that performs authentication of a driver who wishes to drive, an authentication apparatus that performs authentication of a visitor to an apartment, a building, a hall, or a room, a terminal apparatus that is individually owned, such as a personal computer, a smartphone, or the like, and performs user authentication, determines whether or not the user is holding a correct portable device or a portable object that is associated with the user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory storing a control program,
   a detecting device, and
   a hardware processor, executing the control program to
      authenticate a user holding a portable device;
      receive a terminal identification information of a first portable device that is associated to the user, wherein the terminal identification information of the first portable device and an association with the user are registered in a database in advance;
      upon successfully authenticating the user, transmit an action instructing signal for issuing an instruction to the portable device to perform an action on the portable device, wherein the action instructing signal is outputted based on the terminal identification information of the first portable device, via wireless communication, wherein the portable device has a sensor sensing bio-information and/or a position information;
      detect a change of a status of the portable device through receiving a signal transmitted as a response to the action instructing signal from the portable device, wherein the change of status is a visual change from at least part of portable device, auditory change from the portable device, an operation of user on the portable device, or radio signal of specific frequency from the portable device;
      determine, based on the change of the status of the portable device responding to the action instructing signal transmitted, whether or not the portable device held by the user is the first portable device associated with the user registered in the database; and
      store bio-information and/or position information obtained from the sensor of the portable device to the memory after the user is authenticated and the hardware processor determines that the portable device is the first portable device registered and associated with the user in the database.

2. The information processing apparatus according to claim 1, the hardware processor executing the control program to be further configured to:
   identify the terminal identification information of the first portable device,
   wherein the hardware processor is configured to transmit the action instructing signal to the portable device corresponding to the identified terminal identification information.

3. The information processing apparatus according to claim 2,
   wherein the action instructing signal instructs the portable device to cause the visual change from at least part of the portable device,
   wherein the detecting device includes a camera to shoot the visual change.

4. The information processing apparatus according to claim 3,
   wherein the action instructing signal instructs the portable device to emit light, and
   wherein the hardware processor is configured to shoot an image including the portable device to detect the visual change of light emission of the portable device by the camera of the detecting device as the change of the status of the portable device.

5. The information processing apparatus according to claim 3, the hardware processor executing the control program to be further configured to:
   obtain the operation from the user by the detecting device,
   wherein the action instructing signal displays letter information on a display of the portable device, and
   wherein the hardware processor is further configured to detect the change of the status of the portable device in accordance with the letter information obtained by the hardware processor.

6. The information processing apparatus according to claim 2, the hardware processor executing the control program to be further configured to:
   obtain an action by the user by the detecting device,
   wherein the hardware processor is further configured to detect the change of the status of the portable device in accordance with the action of the user obtained by the detecting device.

7. The information processing apparatus according to claim 2,
   wherein the action instructing signal instructs the portable device to perform an action for outputting sound,
   wherein the detecting device includes a microphone to detect the sound output from the portable device, and
   wherein the hardware processor is configured to detect the sound output from the portable device to detect the auditory change of the portable device as the change of the status.

8. The information processing apparatus according to claim 2, the hardware processor executing the control program to be further configured to:
   notify, in a case where the hardware processor is configured to determine that the user is not holding the first portable device associated with the user in advance, a predetermined notification destination that the authenticated user is not holding the first portable device.

9. The information processing apparatus according to claim 2,
   wherein the detecting device includes a receiver to receive the bio-information of the user from the portable device, and
   wherein the hardware processor is further configured to detect the change of the status of the portable device in accordance with the bio-information of the user.

10. The information processing apparatus according to claim 2,
    wherein the detecting device includes a receiver to receive positional information of the user from the portable device, and
    wherein the hardware processor is further configured to detect the change of the status of the portable device in accordance with the positional information of the user.

11. The information processing apparatus according to claim 1, wherein the action instructing signal instructs the portable device to cause the visual change from at least part of the portable device, and wherein the detecting device includes a camera to shoot the visual change.

12. The information processing apparatus according to claim 3, wherein the action instructing signal instructs the portable device to emit light, and wherein the hardware processor is configured to shoot an image including the portable device to detect the visual change of light emission of the portable device by the camera of the detecting device as the change of the status of the portable device.

13. The information processing apparatus according to claim 11, the hardware processor executing the control program to be further configured to:

obtain the operation from the user by the detecting device, wherein the action instructing signal displays letter information on a display of the portable device, and wherein the hardware processor is configured to detect the change of the status of the portable device in accordance with the letter information obtained by the hardware processor.

14. The information processing apparatus according to claim 1, the hardware processor executing the control program to be further configured to obtain an action by the user by the detecting device, wherein the hardware processor is further configured to detect the change of the status of the portable device in accordance with the action of the user obtained by the detecting device.

15. The information processing apparatus according to claim 1, wherein the action instructing signal instructs the portable device to perform an action for outputting sound, wherein the detecting device includes a microphone to detect the sound output from the portable device, and wherein the hardware processor is configured to detect the sound output from the portable device to detect the auditory change of the portable device as the change of the status.

16. The information processing apparatus according to claim 1, the hardware processor executing the control program to be further configured to:

notify, in a case where the hardware processor is configured to determine that the user is not holding the first portable device that has been associated with the user in advance, a predetermined notification destination that the authenticated user is not holding the first portable device.

17. The information processing apparatus according to claim 1, wherein the detecting device includes a receiver to receive the bio-information of the user from the portable device, and wherein the hardware processor is further configured to detect the change of the status of the portable device in accordance with the bio-information of the user.

18. The information processing apparatus according to claim 1, wherein the detecting device includes a receiver to receive positional information of the user from the portable device, and wherein the hardware processor is further configured to detect the change of the status of the portable device in accordance with the positional information of the user.

19. An information processing apparatus of claim 1, wherein the sensor of the portable device comprise a first sensor sensing the bio-information and a second sensor sensing the position information, and the bio-information and the position information respectively from the first sensor and the second sensor are stored in the memory after the user is authenticated and after the portable device is determined to be the first portable device registered and associated with the user in the database.

20. A non-transitory computer readable medium storing a program causing a computer to execute a process for information processing, the process comprising:

authenticating a user holding a portable device;

receiving a terminal identification of a first portable device that is associated to the user, wherein the terminal identification information of the first portable device and an association with the user are registered in a database;

upon successfully authenticating the user, transmitting an action instructing signal for issuing an instruction to the portable device to perform an action on the portable device, wherein the action instructing signal is outputted based on the terminal identification of the first portable device, via wireless communication, wherein the portable device has a sensor sensing bio-information and/or a position information;

detecting a change of a status of the portable device through receiving a signal transmitted as a response to the action instructing signal from the portable device, wherein the change of status is a visual change from at least part of portable device, auditory change from the portable device, an operation of user on the portable device, or radio signal of specific frequency from the portable device;

determining, based on the change of the status, whether or not the portable device held by the user responding to the transmitted action instructing signal is the first portable device associated with the user registered in the database; and storing the bio-information and/or the position information obtained from the sensor of the portable device to a memory after the user is authenticated and the portable device being determined to be the first portable device being registered to be associated with the user in the database.

21. A method of information processing comprising:

authenticating a user holding a portable device;

receiving a terminal identification information of a first portable device that is associated to the user, wherein the terminal identification information of the first portable device and an association with the user are registered in a database;

upon successfully authenticating the user, transmitting an action instructing signal for issuing an instruction to the portable device to perform an action on the portable device, wherein the action instructing signal is outputted based on the terminal identification information of the first portable device, via wireless communication, wherein the portable device has a sensor sensing bio-information and/or a position information;

detecting a change of a status of the portable device through receiving a signal transmitted as a response to the action instructing signal from the portable device, wherein the change of status is a visual change from at least part of portable device, auditory change from the portable device, an operation of user on the portable device, or radio signal of specific frequency from the portable device;

determining, based on the change of the status of the portable device responding to the transmitted action instructing signal, whether or not the portable device held by the user is the first portable device associated with the user registered in the database; and storing the bio-information and/or the position information obtained from the sensor of the portable device to a memory after the user is authenticated and a determination of the portable device being held by the user is the first portable device being registered to be associated with the user in advance in the database.

* * * * *